US007420355B2

(12) United States Patent
Liu et al.

(10) Patent No.: US 7,420,355 B2
(45) Date of Patent: Sep. 2, 2008

(54) DC-DC CONVERTER WITH OVER-VOLTAGE PROTECTION

(75) Inventors: Jiangang Liu, Shrewsbury, MA (US); Yonghan Kang, Mansfield, MA (US)

(73) Assignee: Artesyn Technologies, Inc., Carlsbad, CA (US)

( * ) Notice: Subject to any disclaimer, the term of this patent is extended or adjusted under 35 U.S.C. 154(b) by 138 days.

(21) Appl. No.: 11/484,158

(22) Filed: Jul. 11, 2006

(65) Prior Publication Data

US 2008/0012542 A1 Jan. 17, 2008

(51) Int. Cl.
*G05F 1/571* (2006.01)

(52) U.S. Cl. .......................... 323/271; 323/282; 361/18

(58) Field of Classification Search ................. 323/266, 323/271, 282, 284; 361/18
See application file for complete search history.

(56) References Cited

U.S. PATENT DOCUMENTS 3,737,725 A 6/1973 Donnelly
4,727,308 A 2/1988 Huljak et al.
5,091,818 A 2/1992 Morikawa et al.
5,335,132 A 8/1994 DeShazo, Jr.
5,751,531 A 5/1998 Rault
6,731,486 B2 5/2004 Holt et al.
6,873,191 B2 3/2005 Dequina et al.
7,038,430 B2 * 5/2006 Itabashi et al. .............. 323/224

* cited by examiner

*Primary Examiner*—Jeffrey L Sterrett
(74) *Attorney, Agent, or Firm*—K & L Gates LLP

(57) ABSTRACT

A DC-DC converter includes a control circuit for generating a pulse width modulated signal based on a voltage of an output node. A first switch is connected to conduct during pulses, and a second switch conducts between pulses. The first switch is connected to an internal power node and the second is connected to a current return node. There is a common node between the first switch and the second switch. The voltage of the common node is supplied to an output node. An input power switch supplies voltage to the internal power node. An over-voltage protection circuit is connected to receive an over-voltage fault signal from the control circuit, and it is connected to control a bias of the control terminal of the input power switch to cause the input power switch not to conduct during an event causing an over-voltage fault signal, whereby a load connected to the output node is protected.

18 Claims, 5 Drawing Sheets

90
VIN
10
92
11
12
31
97
93
22
MOSFET
Driver
UGATE
PHASE
LGATE
13
15
14
16
18
(VOUT)
19
Load
17
31
96
98
94
95
29
28
62
31
20
PWM
21
PWM Generator
42
Current Sensing Circuit
44
Output Voltage Error Amplifier
41
Over-voltage monitoring circuit
43
60
Control Circuit

DC-DC CONVERTER WITH OVER-VOLTAGE PROTECTION

BACKGROUND

The present invention is directed to a DC-DC converter and, more particularly, a DC-DC converter having over-voltage protection to protect a load of the DC-DC converter.

DC-DC converters are extensively employed in many electronic devices such as desktop computers, laptops, and servers, as well as more sophisticated equipment, such as telephone central office switching offices, cellular telephone base stations, data storage systems, etc. In particular, it is common practice to employ a DC-DC converter to supply a highly-regulated voltage to integrated circuits, such as a microprocessor, in such computing equipment.

A type of DC-DC converter which is extensively employed employs two switches connected in bucking relationship. One is connected to a supply voltage line and the other to ground or an equivalent return path. A common node connects the two switches, and the voltage of the common node is filtered and supplied to the load. The two switches are alternatively turned on and off based on a pulse width modulated signal. The voltage of the output node is varied and controlled by the width of the pulses.

FIG. 1 is an illustration of a prior art DC-DC converter which employs metal oxide field effect transistors (MOSFETS). A control circuit 21 provides a pulse width modulated signal to MOSFET driver 22 for the MOSFETS 13 and 14. MOSFET 13 is connected to a substantially constant voltage, for example, to voltage supply node 10. MOSFET 13 is also connected to the common node 15 (denoted in FIG. 1 as a "phase node"). MOSFET 14 connects the common node 15 to ground. The MOSFET driver 22 provides shoot-through protection so that MOSFET 14 never conducts at the same time as MOSFET 13, because that would short the supply voltage on node 10 to ground. The voltage supplied to common node 15 is filtered by inductor 16 and capacitor 17 to stabilize the output voltage on OUTPUT node 18. The output voltage supplied to node 18 is for supplying power to load 19. Feedback line 60 feeds the output voltage back to the control circuit 21, which responds to the output voltage by adjusting the width of the pulses and thus controls the output voltage. Capacitor 12 minimizes the voltage ripple on node 10 caused by the switching current through the MOSFET 13. A sensed current signal is connected to the control circuit 21 through resistor 20.

In many cases, the load energized by such a converter is quite expensive, and such a DC-DC converter has an unfortunate failure mode in which the switch connecting supply voltage to the common node fails closed. In that event, the supply voltage is connected directly to the load, thus damaging or destroying the load FIG. 2 is a schematic based on oscilloscope traces of voltages during failure of switch 13, in which it fails in the conducting mode. Curve 55 represents the voltage of the common (or "phase") node 15. The left side of the figure illustrates the normal situation in which common node 15 is alternatively connected to node 10 and to ground through switches 13 and 14, respectively. The right side of the figure illustrates the failure mode, in which it is only connected to the voltage supply node 10. Curve 58 illustrates the voltage of the output node 18. As can be seen from the figure, the voltage of the output node 18 rises continuously toward the voltage of the voltage supply node 10.

To prevent the type of failure mode illustrated in FIG. 2, various circuit arrangement for clamping or otherwise preventing the voltage on output node 18 from exceeding a preset limit have been proposed.

U.S. Pat. No. 6,873,191 provides a circuit for clamping the voltage of the common node and hence the output voltage. To accomplish this, the common node is connected through a resistor to the gate of the MOSFET that connects the common node to ground. When the voltage of the common node increases, the resistive connection to the gate of the MOSFET increases the voltage of the gate and causes the MOSFET to conduct. This defeats the shoot through protection, and shorts the supply voltage to ground. Thus, the load is protected from excessive voltage.

U.S. Pat. No. 6,731,486 has a voltage protection circuit connected to the gate of the transistor which connects the common node to ground. In the event of an over-voltage, the voltage protection circuit causes the transistor to conduct. Like the preceding patent, this defeats the shoot through protection, and the supply voltage is shorted to ground.

U.S. Pat. No. 5,751,531 employs a clipping device such as a zener diode to limit the voltage applied to an output. As with the two preceding patents, this is done by providing a low resistance path to ground.

U.S. Pat. No. 5,335,132 has a zener diode which breaks down in the event of an over-voltage condition, whereby the operating point of the circuit is shifted.

U.S. Pat. No. 5,091,818 has an over-voltage protection circuit which has a voltage clamping transistor to clamp the power supply voltage to a voltage of less than the rated voltage.

U.S. Pat. No. 4,727,308 has an over-voltage protection circuit in which excess voltage is bypassed to ground through a flywheel field effect transistor. This results in a surge in input current, which opens a fuse in the input to the converter.

U.S. Pat. No. 3,737,725 is a circuit over-voltage protector. The circuit has a zener diode which breaks down in the event of an over-voltage. Heavy current through the zener diode causes a circuit breaker or fuse to open.

While the preceding patents have interesting features, it is believed that an improved over-voltage protection principle is needed for a DC-DC converter.

SUMMARY

In one general aspect, the present invention is directed to a DC-DC converter. According to various embodiments, the DC-DC converter comprises a control circuit for generating a pulse width modulated signal and for generating an over-voltage fault signal. The converter also includes a first switch connected to conduct during pulses of the pulse width modulated signal and a second switch connected to conduct during time intervals between pulses of the pulse width modulated signal. The first switch may be connected to an internal power node, which is connectable to a voltage supply node. The second switch is connected to a current return node, and there is a common node between the first switch and the second switch. An output filter circuit may be connected to the common node and to an output node, and the output node is connectable to a load. The control circuit is responsive to a feedback signal from the output node to control a width of the pulses, whereby the voltage of the output node can be controlled.

An input power switch connects the internal power node to the voltage supply node, and a charging circuit connects the pulse width modulated signal to a conduction control terminal of the input power switch. The charging circuit may comprise a resistor and a diode in series whereby the input power switch is caused to conduct when the pulse width modulated signal is turned on. The DC-DC converter may also comprise an over-voltage protection circuit connected to receive the over-voltage fault signal and connected to the conduction control terminal of the input power switch to cause the input power switch not to conduct during an event causing an over-voltage fault signal, whereby a load connected to the output node is protected from an over-voltage condition.

According to other embodiments, the charging circuit may comprise a charging circuit node, the charging circuit node connected to the voltage supply node through a diode in series with a resistor, the charging circuit node further connected through a capacitor to the common node, and the charging circuit node connected through a diode to the conduction control terminal of the input power switch so that the power control conduction control terminal is charged when the pulse width modulated signal causes the voltage of the common node to vary. This embodiment may be utilized, for example, when the gate drive signal to the first switch from a driver circuit is not readily accessible because the driver circuit and switch are integrated into one package.

According to other embodiments, the input power switch may be controlled by a gate biasing circuit which is controlled by an over-voltage fault signal to turn off said input power switch in the event of an over-voltage fault signal.

BRIEF DESCRIPTION OF THE DRAWINGS

Various embodiments of the present invention are described herein by way of example in conjunction with the following figures, wherein.

DESCRIPTION

Figure 1:
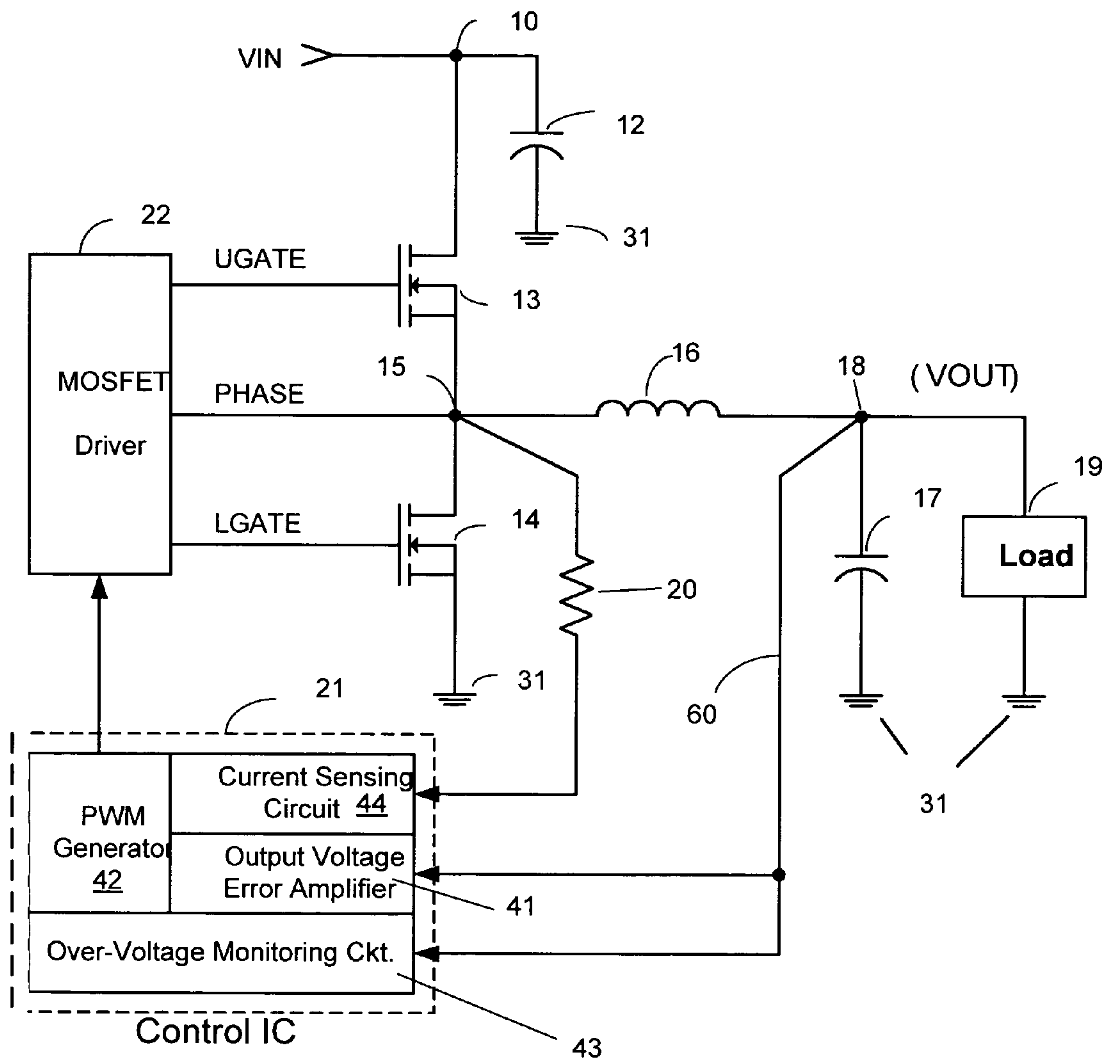
FIG. 1 is a schematic diagram of a prior art DC-DC converter.
Figure 2:
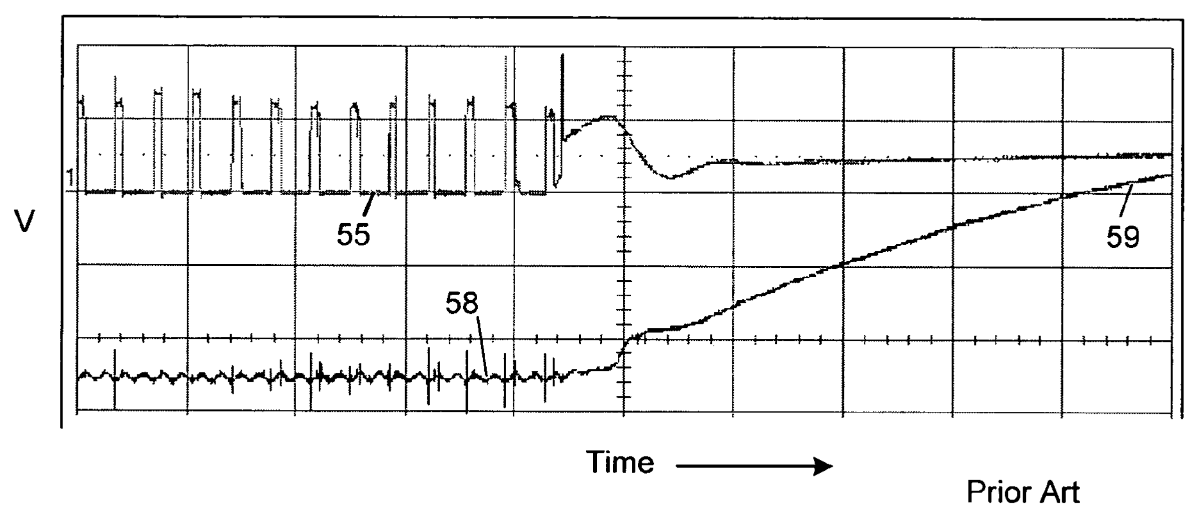
FIG. 2 is a plot illustrating voltage versus time for a failure of one switch in the circuit illustrated in FIG. 1.
Figure 3:
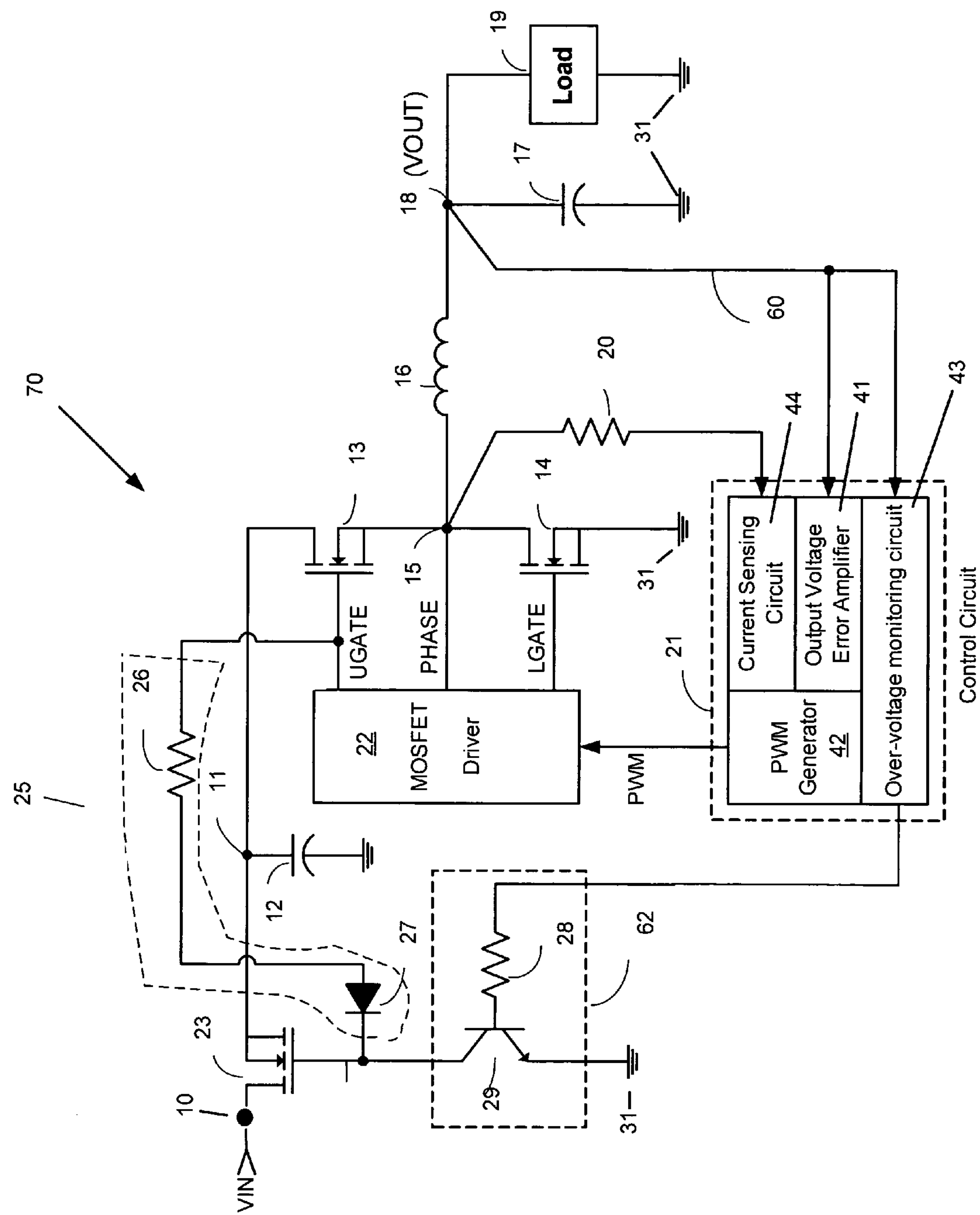
FIG. 3 is a schematic diagram of a DC-DC converter according to one embodiment of the present invention.

FIG. 3 is an illustration of a DC-DC converter, generally designated 70, according to one embodiment of the present invention. A control circuit 21 includes a pulse width modulated ("PWM") signal generator 42 that, preferably, provides a pulse width modulated signal to driver 22 for the switches 13 and 14. Preferably, control circuit 21 is an integrated circuit including, in addition to the pulse width modulated signal generator 42, an output voltage error amplifier 41, which controls the width of the pulses generated by the pulse width modulated signal generator 42. Preferably, control circuit 21 also includes a current sensing circuit 44 and an over-voltage monitoring circuit 43. Although the control circuit 21 is shown in FIG. 3 as one device comprising the above-mentioned components, it should be recognized that the control circuit 21 could be realized as a number of discrete and/or distributed components.

It is presently preferred that switches 13 and 14 be field effect transistors, and most preferably metal oxide field effect transistors (MOSFETS). Switch 13 is connected to a substantially constant voltage, for example, to internal power node 11, which is connectable to the voltage supply node 10. Switch 13 is also connected to the common node 15 (denoted in FIG. 3 as the "phase node").

Switch 14 connects the common node 15 to a current return path 31 that, typically, is ground. The driver 22 provides shoot-through protection so that switch 14 does not ordinarily conduct at the same time as switch 13, because that would short the supply voltage on node 11 to the current return path 31.

The voltage supplied to common node 15 is filtered by an output filter, comprising, for example, inductor 16 and capacitor 17, to stabilize the output voltage on output node 18. The output voltage on node 18 is for supplying power to load 19. Voltage feedback connection 60 feeds the output voltage back to the control circuit 21, which responds to the output voltage by adjusting the width of the pulses of the PWM signal, and thus controls the output voltage. Capacitor 12 minimizes the voltage ripple on node 10 caused by the switching current through the MOSFET 13. A sensed current signal is connected to the control circuit 21 through resistor 20.

To prevent damage to load 19 due to failure of switch 13 wherein switch 13 cannot block current flow, an input power switch 23 is included. Input power switch 23 is connected to the voltage supply node 10 and also to the internal power node 11. It is noted that the control circuit 21 is energized by the input voltage VIN. Thus, it continues to be energized whether or not input power switch 23 is closed.

For normal operation of DC-DC converter 70, the input power switch 23 is in its conducting mode. To enable it to conduct, a charging circuit 25 is included. Charging circuit 25 may comprise, as shown in the embodiment of FIG. 3, a resistor 26 in series with diode 27. Resistor 26 is connected to the gate of switch 13, which substantially carries the voltage of the pulses from the pulse width modulated generator 42. The cathode terminal of the diode 27 is connected to the conduction control terminal of input power switch 23 and the anode terminal to the resistor 26, so that input power switch 23 conducts during normal operation whenever the pulse width modulation generator 42 is generating pulses. A person skilled in the art will recognize that the order of resistor 26 and diode 27 may be reversed, provided the direction of diode 27 is preserved.

In the event that the over-voltage monitoring circuit 43 detects an over-voltage on output node 18, the over-voltage monitoring circuit 43 may generate an over-voltage fault signal, which is received by over-voltage protection circuit 62, described further below. The over-voltage protection circuit 62 removes the charge on the conduction control terminal of input power switch 23 so that the switch 23 ceases to conduct and voltage is removed from node 11, thus allowing switch 14 to be closed. Once the switch 14 is closed, the voltage at node 18 is clamped and the load 19 is protected.

It is presently preferred that over-voltage protection circuit 62 comprise a resistor 28 and a transistor 29. The transistor 29 may be a bipolar junction transistor as shown in the embodiment of FIG. 3, or a MOSFET. The transistor 29 is connected to conduct the charge on the conduction control terminal of input power switch 23 to the ground or other current return path 31 upon receipt of an over-voltage fault signal from over-voltage monitoring circuit 43 through resistor 28.

The preceding discussion is based on the use of a field effect transistor having an n-type channel for the switch 23. An embodiment employing a MOSFET with a p-type channel is presented below in the discussion of FIG. 5.

Figure 4:
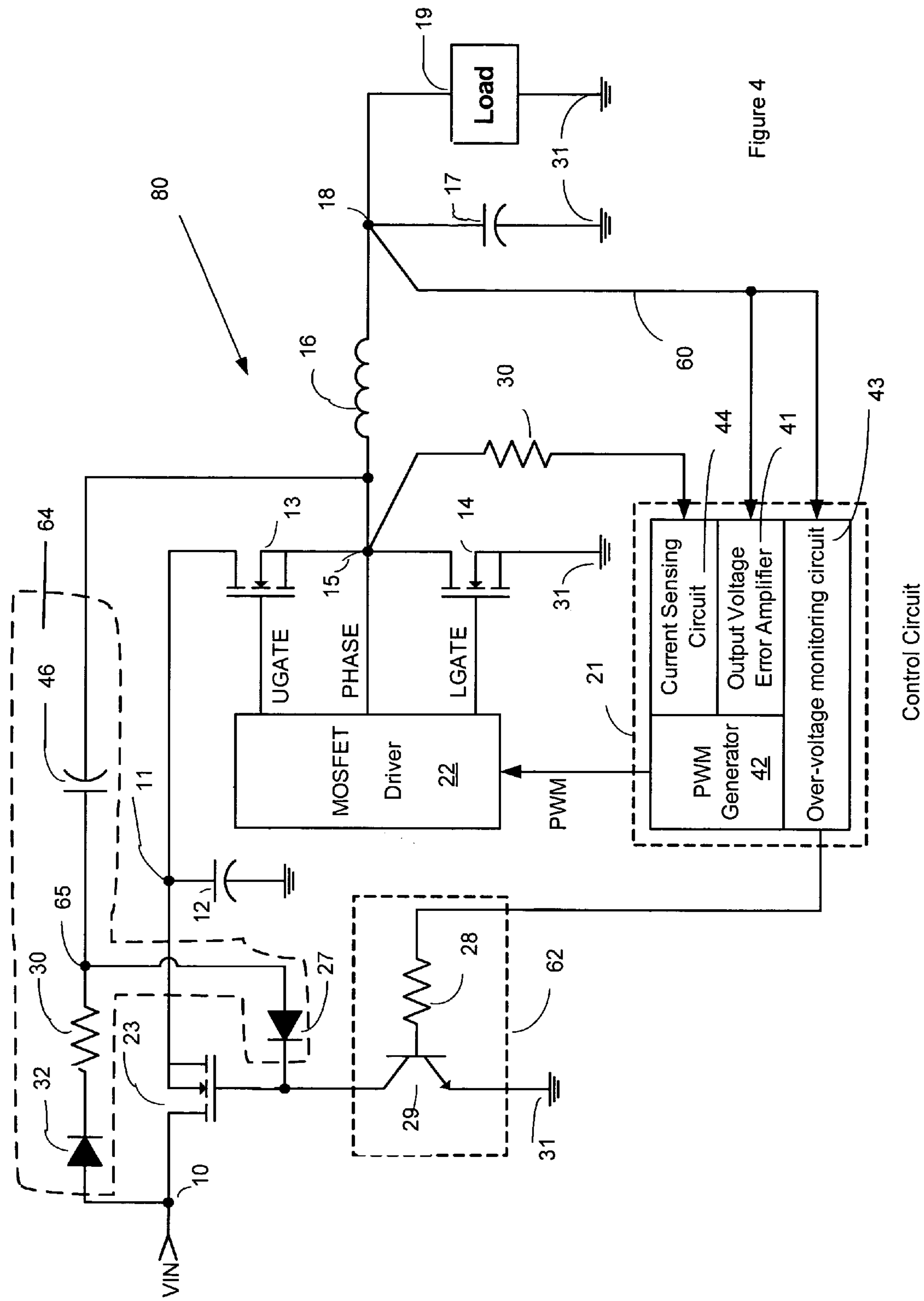
FIG. 4 is a schematic diagram of a DC-DC converter according to a second embodiment of the present invention.

FIG. 4 is an illustration of a DC-DC converter, generally designated 80, according to another embodiment of the present invention. The embodiment illustrated in FIG. 4 is particularly intended for converters in which the signal to the gate of switch 13 is not accessible. This is the case when the driver 22 and the switches 13 and 14 are included in the same integrated circuit.

The embodiment of FIG. 4 is similar to that of FIG. 3, except that in the embodiment of FIG. 4, the charging circuit is different since the gate of the switch 13 is not readily accessible. In the embodiment of FIG. 4, the charging circuit 64 includes a diode 32 and resistor 30. These may be connected in series between voltage supply node 10 and charging circuit node 65, with the anode terminal of the diode 32 connected to the voltage supply node 10 and the cathode terminal connected to the resistor 30. Charging circuit 64 further includes a capacitor 46 connected between the common node 15 and the charging circuit node 65. The anode of diode 27 is connected to the charging circuit node 65 and the cathode is connected to the conduction control terminal of input power switch 23 because the node 15 is connected to node 11 i.e. the source side of the switch 23 through the switch 13.

During normal startup, when switch 14 conducts, the voltage on voltage supply node 10 charges capacitor 46 because one end of capacitor 46 is connected to the current return path 31 via conducting switch 14. Once the input voltage from voltage supply node 10 charges capacitor 46, the voltage across capacitor 46 is not discharged during the turn-off period of the bottom switch 14 due to the blocking diode 32. Then, when the switch 13 conducts and switch 14 does not, the voltage across the capacitor 46 charges the conduction control terminal of the input power switch 23.

In the event that the over-voltage monitoring circuit 43 detects an over-voltage on output node 18, the over-voltage monitoring circuit 43 may generate an over-voltage fault signal, which is received by over-voltage protection circuit 62. The over-voltage protection circuit 62 removes the charge on the conduction control terminal of input power switch 23 so that it ceases to conduct and voltage is removed from node 11, thus allowing the switch 14 to be closed. As a result, the node 18 is clamped and the load 19 is protected.

It is presently preferred that over-voltage protection circuit 62 include a transistor 29 connected to conduct the charge on the conduction control terminal of input power switch 23 to the ground or other current return path 31. The over-voltage fault signal from over-voltage monitoring circuit 43 may be connected to the base of transistor 29 through resistor 28 so that transistor 29 conducts upon receipt of the over-voltage fault signal from over-voltage monitoring circuit 43.

As a result, when the over-voltage monitoring circuit detects an over-voltage condition, it generates an over-voltage fault signal, which causes transistor 29 to conduct. Charge is thus removed from the conduction control terminal of switch 23, which then ceases to conduct. In this manner, voltage is removed from internal power node 11. Preferably, the voltage of node 15 then drops sufficiently that switch 14 can be closed, whereby the voltage of node 15 is clamped.

Figure 5:
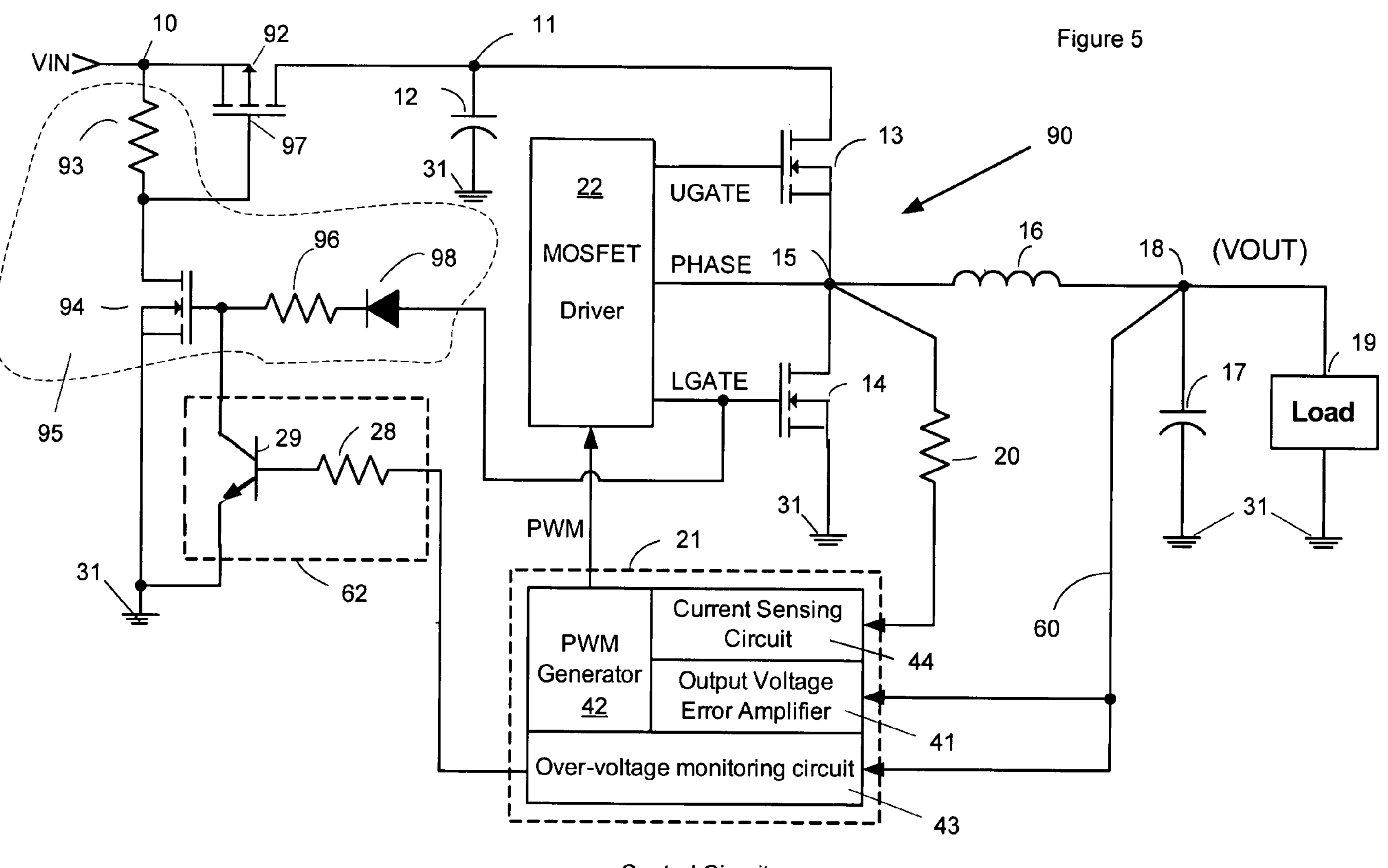
FIG. 5 is a schematic diagram of a DC-DC converter according to a third embodiment of the present invention wherein a p-channel MOSFET is employed as the input power switch.

FIG. 5 is a schematic illustration of an embodiment of the present invention wherein the input power switch is a p-channel MOSFET. Circuit 90 operates in a manner similar to the previously discussed circuits 70 and 80 in so far as the operation of control circuit 21, MOSFET driver 22, swiches 13 and 14, inductor 16, and capacitor 17 are concerned.

In circuit 90, the input power switch 92 having gate 97 replaces the input power switch 23 of circuits 70 and 80. Input power switch 92 may be a P-channel MOSFET. In order to protect the load 19 in the event that switch 13 fails closed, gate biasing circuit 95 is employed. Gate biasing circuit 95 comprises switch 94, bias resistor 93, resistor 96 and diode 98, connected as illustrated in FIG. 5.

When circuit 90 is turned on and the LGATE is generated, the LGATE enables switch 94 to be turned on. Then, the gate voltage of switch 94 is not discharged because of the diode 98. When the switch 94 is turned on, the input voltage VIN generates a current through resistor 93 and supplies bias voltage to the gate 97 of switch 92. Switch 92 turns on because the source of switch 92 has a higher potential than the gate 97. Circuit 90 then operates normally, providing a regulated voltage to the load 19.

In the event that switch 13 fails closed, the output voltage on node 18 increases to a level that is preset in the over-voltage monitoring circuit 43, whereupon circuit 43 generates an over-voltage fault signal. Then, the fault signal triggers the transistor 29 through resistor 28. When the transistor 29 is turned on, the gate voltage of switch 94 is discharged and, accordingly, switch 94 is turned off. The voltage of the gate 97 of switch 92 then is charged to the input voltage VIN and switch 92 is turned off.

In this manner, the energy path from the input to the load is cut off and as a result the PHASE voltage becomes low enough that the bottom switch 14 can be turned on. Once the bottom switch 14 is turned on, the output voltage is clamped and cannot be increased.

In conclusion, the three embodiments presented above provide easy and cost-effective methods to turn on and off the input power switch, so that the output voltage can be clamped, and the load protected.

The invention may also be implemented by switches other than MOSFETS. It would be a simple matter for a person skilled in the art to employ other types of switches. Various other modifications and variations of the present invention can be made in light of the above teachings. It is therefore to be understood that, within the scope of the appended claims, the present invention can be practiced otherwise than as specifically described.

We Claim:

1. A DC-DC converter for powering a load connectable to an output node of the DC-DC converter with power supplied at a voltage supply node of the DC-DC converter, the DC-DC converter comprising:

a control circuit for generating a pulse width modulated signal based on a voltage at said output node and for generating an over-voltage fault signal when said voltage at said output node exceeds a limit;

a first switch connected to conduct during pulses of said pulse width modulated signal;

a second switch connected to conduct during time intervals between pulses of said pulse width modulated signal, wherein said first switch is connected to an internal power node, wherein said internal power node is connectable to said voltage supply node, wherein said second switch is connected to a current return node, and wherein there is a common node between said first switch and said second switch;

an output filter circuit connected to said common node and to said output node, wherein said control circuit is responsive to a feedback signal from said output node to control a width of said pulses of said pulse width modulated signal, whereby a voltage of said output node can be controlled;

an input power switch connecting said internal power node to said voltage supply node;

a charging circuit connecting said pulse width modulated signal to a conduction control terminal of said input power switch, said charging circuit comprising a resistor and a diode in series whereby said input power switch is caused to conduct when said pulse width modulated signal is turned on; and an over-voltage protection circuit connected to receive said over-voltage fault signal from said control circuit, said over-voltage protection circuit connected to said conduction control terminal of said input power switch to cause said input power switch not to conduct during an event causing an over-voltage fault signal.

2. The DC-DC converter of claim 1, wherein said first switch and said second switch are field effect transistors.

3. The DC-DC converter of claim 2, further comprising a field effect transistor driver for controlling said first switch and said second switch, said field effect transistor driver providing shoot-through protection to prevent said first switch and said second switch from conducting at the same time.

4. The DC-DC converter of claim 1, wherein said over-voltage protection circuit causes a voltage of said common node to drop sufficiently so that said second switch can be closed, whereby a voltage of said output node is clamped.

5. The DC-DC converter of claim 1, wherein said over-voltage protection circuit includes an over-voltage protection switch, said over-voltage protection switch connected to be closed by said over-voltage fault signal from the control circuit, whereby said input power switch is opened.

6. The DC-DC converter of claim 5, wherein said over-voltage protection switch comprises a transistor, said transistor connected to conduct in response to said over-voltage fault signal.

7. The DC-DC converter of claim 1 wherein said output filter comprises an inductor connected to said common node and to said output node.

8. The DC-DC converter of claim 7, wherein said output filter further comprises a capacitor connected to said output node and to said current return node.

9. The DC-DC converter of claim 1, wherein said input power switch comprises a field effect transistor.

10. A DC-DC converter for powering a load connectable to an output node of the DC-DC converter with power supplied at a voltage supply node of the DC-DC converter, the DC-DC converter comprising:

a control circuit for generating a pulse width modulated signal based on a voltage at said output node and for generating an over-voltage fault signal when said voltage at said output node exceeds a limit;

a first switch connected to conduct during pulses of said pulse width modulated signal;

a second switch connected to conduct during time intervals between pulses of said pulse width modulated signal, wherein said first switch is connected to an internal power node, wherein said internal power node is connectable to said voltage supply node, wherein said second switch is connected to a current return node, and wherein there is a common node between said first switch and said second switch;

an output filter circuit connected to said common node and to an output node, wherein said control circuit is responsive to a feedback signal from said output node to control a width of said pulses, whereby a voltage of said output node can be controlled;

an input power switch connecting said internal power node to said voltage supply node;

a charging circuit connected to a conduction control terminal of said input power switch for enabling said input power switch to conduct;

an over-voltage protection circuit connected to receive said over-voltage fault signal, said over-voltage protection circuit connected to said conduction control terminal of said input power switch to cause said input power switch not to conduct during an event causing an over-voltage fault signal, whereby a load connected to said output node is protected from an over-voltage condition.

11. The DC-DC converter of claim 10, wherein said input power switch is a field effect transistor.

12. The DC-DC converter of claim 10, wherein said charging circuit comprises a charging circuit node, said charging circuit node connected to said voltage supply node through a diode in series with a resistor, said charging circuit node further connected through a capacitor to said common node, and said charging circuit node connected through a diode to said conduction control terminal of said input power switch whereby said power switch conduction control terminal is charged when said pulse width modulated signal causes a voltage of said common node to vary.

13. The DC-DC converter of claim 10, wherein said first switch and said second switch are field effect transistors.

14. The DC-DC converter of claim 13, further comprising a field effect transistor driver for controlling said first switch and said second switch, said field effect transistor driver providing shoot-through protection to prevent said first switch and said second switch from conducting at the same time.

15. A method of providing over-voltage protection for a DC-DC converter comprising a pair of bucking switches alternatively opened and closed by pulses of a pulse width modulated signal from a control circuit, a first one of said pair of bucking switches connected to an internal power node and a second one of said pair of bucking switches connected to a current return node wherein a width of said pulses controls the voltage, said method comprising:

providing a power input switch to conduct an input voltage to said internal power node, said power input switch caused to conduct upon startup of said pulse width modulated signal;

providing an over-voltage protection circuit connected to receive an over-voltage signal from said control circuit, said over-voltage protection circuit connected to a conduction control terminal of said power input switch to open said power input switch in case of an over-voltage condition.

16. The method of claim 15 further including the response to an over-voltage condition by closing said second switch to clamp an output voltage of said converter.

17. A DC-DC converter for powering a load connectable to an output node of the DC-DC converter with power supplied at a voltage supply node of the DC-DC converter, the DC-DC converter comprising:

a control circuit for generating a pulse width modulated signal based on a voltage at said output node and for generating an over-voltage fault signal when said voltage at said output node exceeds a limit;

a first switch connected to conduct during pulses of said pulse width modulated signal;

a second switch connected to conduct during time intervals between pulses of said pulse width modulated signal, wherein said first switch is connected to an internal power node, wherein said internal power node is connectable to said voltage supply node, wherein said second switch is connected to a current return node, and wherein there is a common node between said first switch and said second switch;

an output filter circuit connected to said common node and to said output node, wherein said control circuit is responsive to a feedback signal from said output node to control a width of said pulses of said pulse width modulated signal, whereby a voltage of said output node can be controlled;

an input power switch connecting said internal power node to said voltage supply node;

a gate biasing or gate charging circuit for controlling a voltage of a gate of said input power switch, said gate biasing or gate charging circuit controlled by an over-voltage protection circuit to turn off said input power switch in the event of an over-voltage condition whereby said load is protected.

18. The DC-DC converter of claim 17, wherein said over-voltage protection circuit causes a voltage of said common node to drop sufficiently so that said second switch can be closed, whereby a voltage of said output node is clamped.

* * * * *